June 7, 1938.  R. M. HARDGROVE  2,119,580
FUEL BURNER
Filed Jan. 18, 1936   3 Sheets-Sheet 1
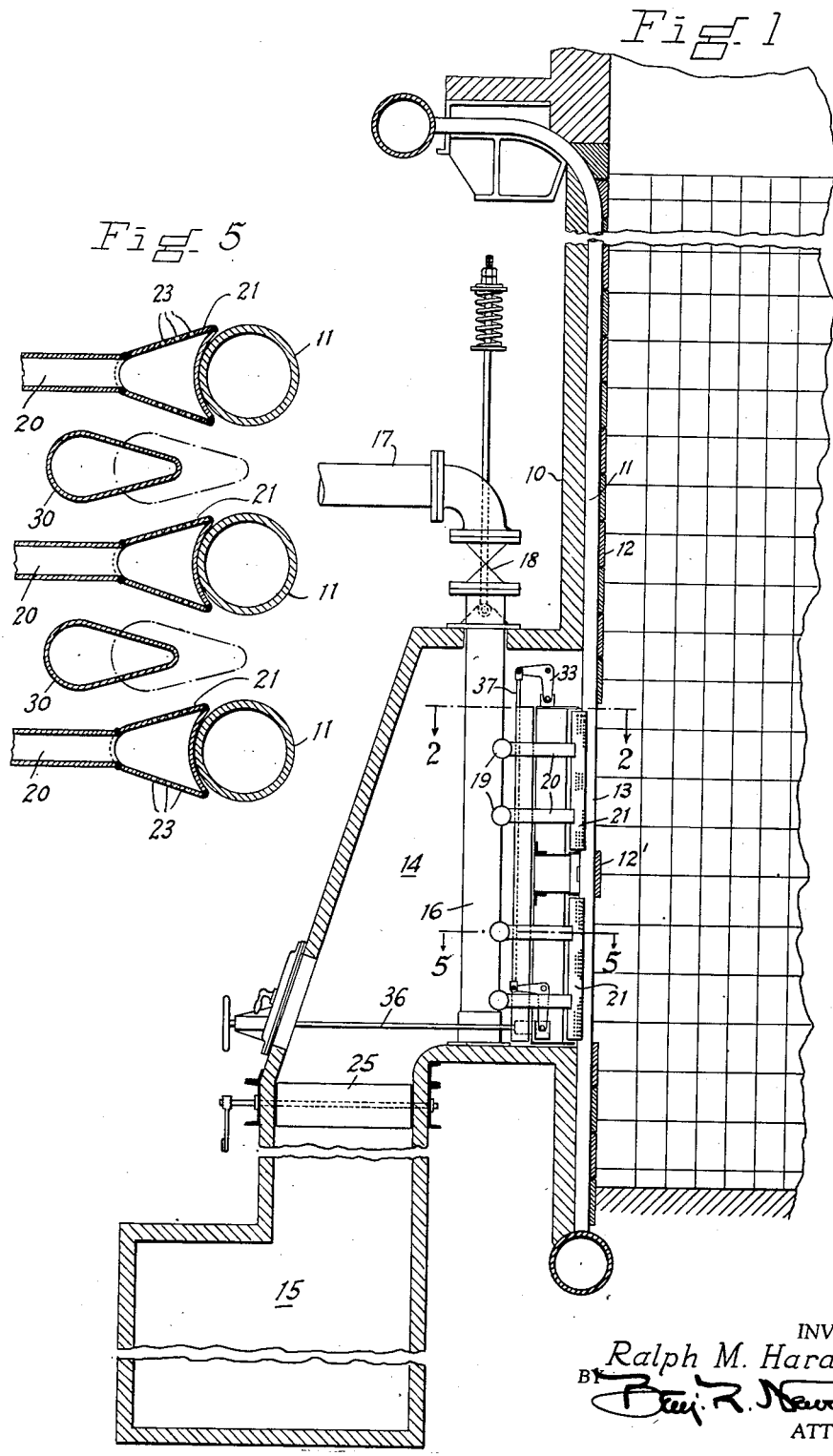
INVENTOR.
Ralph M. Hardgrove
BY
ATTORNEY.

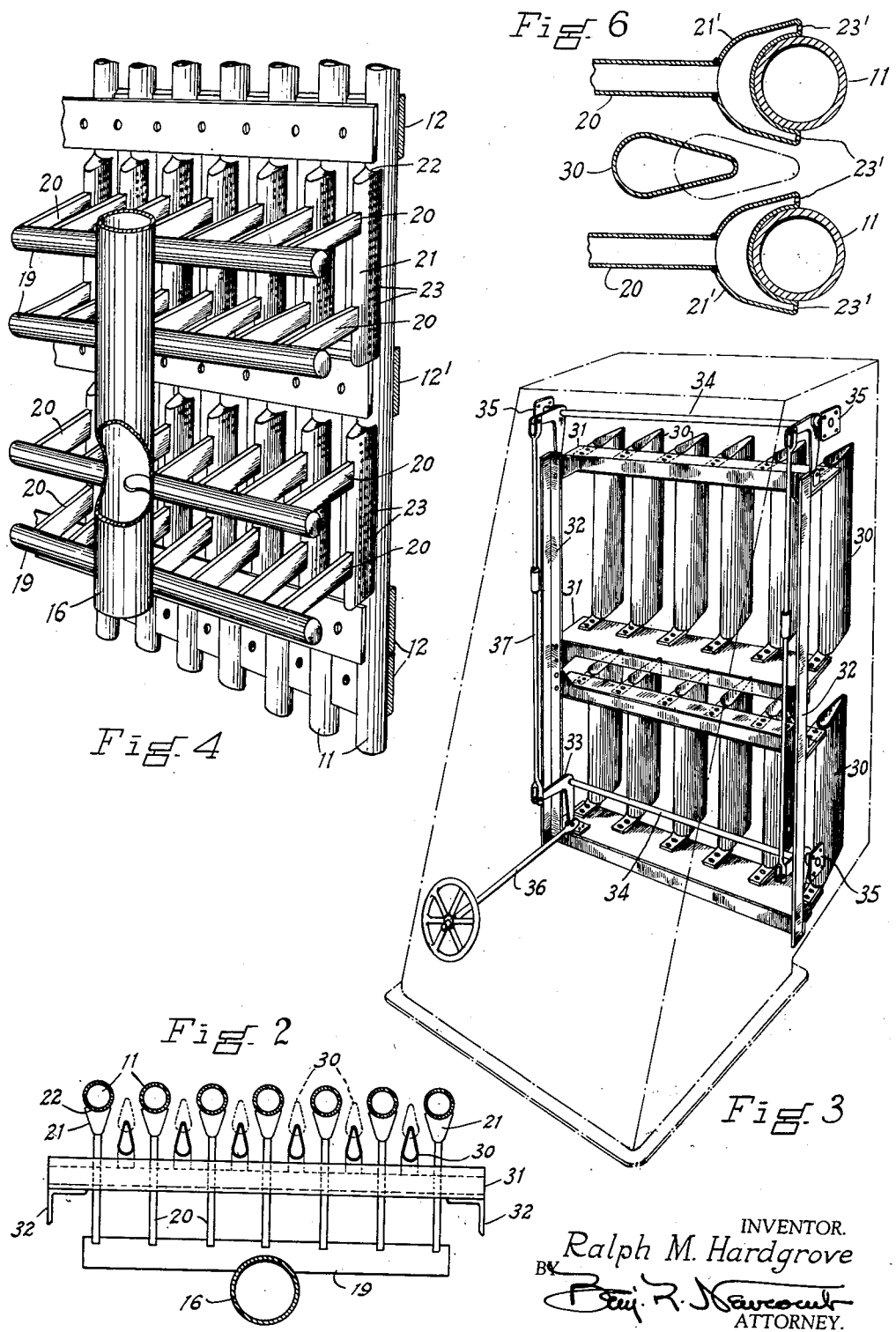

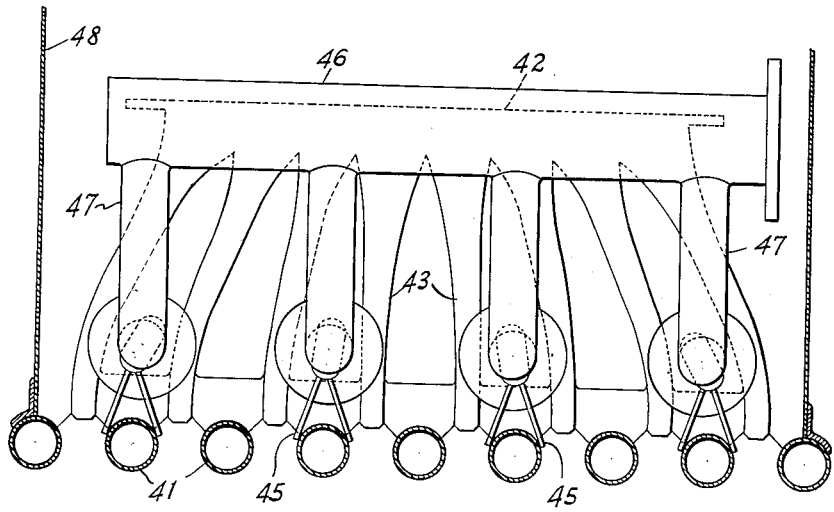
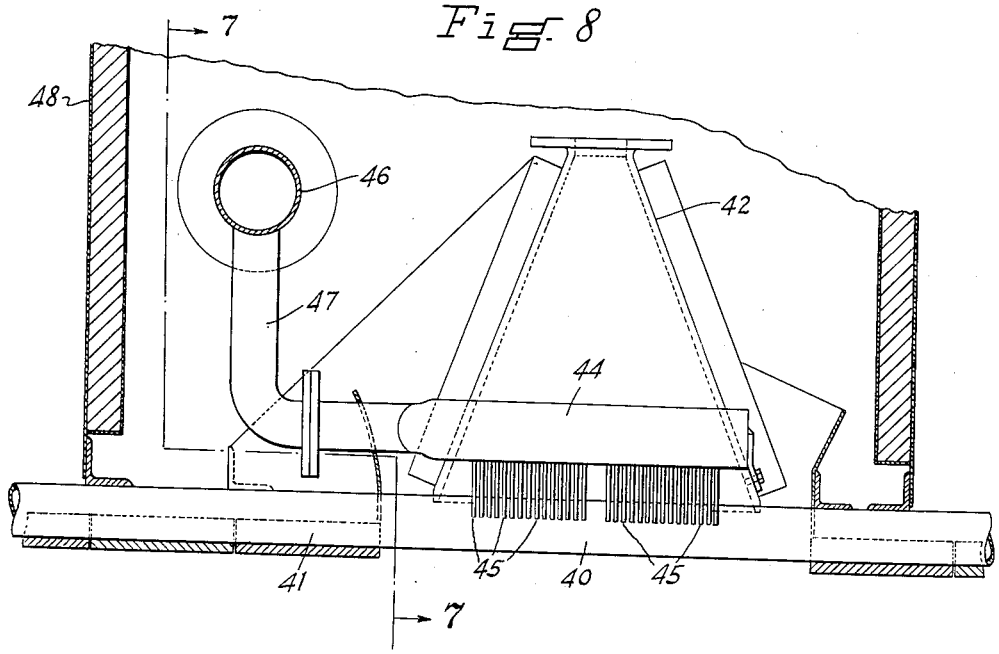

Patented June 7, 1938

2,119,580

UNITED STATES PATENT OFFICE 2,119,580

FUEL BURNER

Ralph M. Hardgrove, Westfield, N. J., assignor to The Babcock & Wilcox Company, Newark, N. J., a corporation of New Jersey Application January 18, 1936, Serial No. 59,677

11 Claims. (Cl. 158—7)

The present invention relates in general to the construction and operation of fuel burners, and more particularly to fuel burners adapted for use with furnaces having one or more tube cooled walls, wherein the fuel is discharged through the intertube spaces of such a wall.

The main object of my invention is the provision of an improved construction and arrangement of a fluid fuel burner of the type described which is characterized by a formation and arrangement of the fuel discharge parts relative to the wall cooling tubes protecting the fuel discharge parts from overheating while affording an adequate flow area for the fluid fuel and combustion air in approaching and passing through the intertube spaces. A further object is the provision of flow control means for regulating the velocity of the combustion air through the burner port past the fuel discharge means. Another and more specific object is the provision of a gaseous fuel burner construction which is especially adapted for use in combination with a pulverized fuel burner having a series of discharge nozzles arranged to discharge through the intertube spaces.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described preferred embodiments of my invention.

Of the drawings:

Fig. 1 is a sectional elevation of a fluid cooled furnace wall through which discharges a fuel burner constructed in accordance with my invention;

Fig. 2 is a partial plan view of the burner taken on the line 2—2 of Fig. 1;

Fig. 3 is a perspective view of the control damper assembly;

Fig. 4 is a perspective view of the fuel burner assembly with the damper assembly omitted;

Fig. 5 is an enlarged section taken on the line 5—5 of Fig. 1;

Fig. 6 is a view similar to Fig. 5 illustrating a modification;

Fig. 7 is a vertical section taken on the line 7—7 of Fig. 8 of a combination fuel burner constructed in accordance with my invention; and Fig. 8 is a side view of the burner shown in Fig. 7.

In the embodiment of my invention shown in Figs. 1–5, a gaseous fuel burner is mounted to discharge through one of the vertical walls 10 of a steam boiler furnace. The wall 10 has a row of vertically extending transversely spaced water tubes 11 at its inner side covered by blocks 12 or other suitable means to close the intertube spaces. Some of the blocks are omitted to form one or more rectangular burner ports 13 near the furnace floor. Enclosing each burner port 13 at its outer side is a spring supported casing 14 having its lower outer end connected to a common duct 15 through which preheated combustion air is ordinarily supplied.

The gaseous fuel burner parts comprise a vertical fuel distributing header 16 having its upper end extending through the casing 14 and connected to a gaseous fuel supply pipe 17 controlled by a valve 18. Within the casing, the header 16 opens at vertically spaced points to horizontal fuel pipes 19 extending across the burner port 13. Each of the pipes 19 has inwardly extending branches 20 leading to separate gaseous fuel manifolds or nozzles 21, each manifold having a pair of branches 20 connected to the upper and lower portions thereof.

The burner port 13 is divided into upper and lower sections by a row of tube blocks 12', forming in effect two superposed burner ports. Inasmuch as the fuel burner parts and flow regulator construction for both sections are similar, only those for one section will be specifically described. Each gaseous fuel discharge manifold 21 is formed by an elongated hollow member having a concave inner side 22 shaped to fit in heat transfer relation against the outer side of a corresponding wall tube 11 and tapering outwardly. The manifolds extend along the tubes 11 to points adjacent the upper and lower limits of the corresponding burner port and a multiplicity of small discharge openings or orifices 23 are formed in the opposite converging sides throughout their lengths for the discharge of the gaseous fuel. This arrangement of the gas manifolds minimizes their obstruction to the air flow through the burner port, while it adequately prevents their overheating from furnace radiant heat.

With the foregoing construction and arrangement of the parts, the gaseous fuel will be discharged in a multiplicity of small horizontal jets into the spaces between the fuel discharge manifolds 21. Combustion air, preferably preheated, will be supplied to the casing 14 from the duct 15, the connecting passage being controlled by one or more dampers 25, and passes to the burner port at a relatively high velocity. The combustion air will sweep up and mix with the discharged fuel gas in the spaces between the discharge manifolds and in the intertube spaces before entering the furnace.

To insure the maintenance of desirable combustion conditions in the furnace and to avoid combustion of the mixed gas and air streams before entering the furnace, the combustion air velocity is desirably maintained above a predetermined minimum at all times. For this purpose, the velocity of the air through both the burner port sections is simultaneously controlled through a damper assembly comprising superposed rows of vertically extending transversely spaced hollow dampers 30, each of ovate or tear-shaped horizontal cross-section tapering towards its inner end. The dampers are mounted in a movable frame comprising vertically spaced transverse plates 31 connected by side bars 32. The dampers are positioned at the inner side of the plates 31 at points so spaced as to have their inner edges coplanar with the vertical center lines of the intertube spaces when installed in position. The frame is bodily swingable inwardly and upwardly by means of bell-crank levers 33 carried by upper and lower rods 34 having their ends mounted in bearings 35 mounted on the sides of the casing 14. The frame is pivotally connected to corresponding legs of the levers 33 and is moved by an axially movable rod 36 having its inner end pivotally connected to the frame leg of one of the lower bell crank levers and its outer end adjustably held in the outer side of the casing 14. The free legs of corresponding upper and lower levers 33 are connected by adjustable links 37 to insure similar bodily movements of all portions of the damper assembly.

With the dampers located as shown in full lines in Figs. 2 and 5, the combustion air passing to each intertube space will be split into two streams, each passing between one side of the damper and the adjacent and substantially parallel side of the adjacent gas nozzle 21. The gas jets discharge into the passages so formed and are swept up by and mixed therein with the combustion air. The air velocity can be increased as desired by moving the control shaft 36 inwardly to cause the dampers to move inwardly towards the wall tubes to a position such as indicated in broken lines, and thereby decrease the effective flow area through the burner port into the furnace. Variations in the gas and air supplies can thus be compensated for to maintain uniform mixing of the gas and air, while avoiding the presence of dead pockets and eddy currents in the mixing zone. The direction of discharge of the air past the gas orifices and of the mixed fuel and air streams will remain substantially unchanged due to the parallel arrangement of the damper sides with the opposite passage-forming parts. The outermost row of gas orifices will be opposite to the straight side of the adjacent damper, even in the indicated innermost position of the damper so that the gas jets will always be discharged into a high velocity zone. Where less rapid mixing and ignition of the gas is desirable to maintain lower wall tube temperatures, the gas manifolds are constructed as shown in Fig. 6. In this construction, the manifolds 23' extend around the tubes 11 and the discharge orifices 23' are located in the outer ends thereof, so as to discharge at about the axial plane of the tubes. With this arrangement, the gas and air will mix adjacent the inner side of the tube axial plane, so that the temperatures to which the sides of the tubes are exposed will be lowered. The velocity of the combustion air is controlled as heretofore described.

In the modification shown in Figs. 7 and 8, a gaseous fuel burner is shown as mounted in a furnace arch and associated with a pulverized fuel burner to form a combination fuel burner discharging downwardly through a burner port 40 across which a row of tubes 41 extend in transversely spaced relation. The pulverized fuel burner comprises a diverging tip member 42 divided into a plurality of discharge nozzles 43, each having an elongated discharge opening adjacent the outer sides of the tubes 41 and with its longitudinal axis coplanar with the center line of the corresponding intertube space. The gaseous fuel burner is formed by a series of discharge manifolds 44 located at the outer side of alternate tubes 41 and each provided at its inner side with two diverging rows of small nozzles 45 extending inwardly with their ends contacting with opposite sides of the corresponding tubes 41. The manifolds 44 are connected at one end to a common supply header 46 by pipes 47. An air supply casing 48 extends outwardly from the boundaries of the burner port 40 and encloses the fuel discharge parts of the two fuel streams.

With the parts constructed and arranged as shown in Figs. 7 and 8, the two fuels can be supplied either simultaneously or separately. The mixture of pulverized fuel and primary air discharges downwardly from the nozzles 43 in a plurality of elongated streams passing through the intertube spaces, wherein they mix with the secondary air streams entering each intertube space around the corresponding pulverized fuel stream. The jets of gaseous fuel enter each intertube space adjacent one of the space-defining tubes and mix with the air passing into the furnace. The amount and velocity of the fuel and air streams can be suitably controlled to obtain a relatively rapid and intimate mixing of the fuel and air streams and thereby short flame combustion in the furnace.

While in accordance with the provisions of the statutes I have illustrated and described herein the best forms of my invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. In a furnace wall having a fuel burner port, a fuel burner arranged to discharge fuel through said burner port comprising a plurality of transversely spaced vertically elongated hollow fuel discharge members having fuel discharge openings at opposite vertically extending sides thereof, air supply means opening to the spaces between said fuel discharge members, and means for supplying fuel to said fuel discharge members.

2. In a furnace wall having a fuel burner port, a fuel burner arranged to discharge fuel through said burner port comprising a plurality of transversely spaced vertically elongated hollow fuel discharge members having fuel discharge openings along opposite vertically extending sides thereof, an air supply casing surrounding said fuel burner and opening to the spaces between said fuel discharge members, and means for supplying a fluid fuel to said fuel discharge members.

3. In a furnace wall having a fuel burner port and a series of transversely spaced tubes extending across said burner port, a fuel burner arranged to discharge fuel through said burner port comprising a plurality of transversely spaced hollow fuel discharge members extending along the outer sides of corresponding tubes, means for discharging fuel from each of said members at opposite sides of said corresponding tubes, and air supply means opening to said burner port.

4. In a furnace wall having a fuel burner port and a series of transversely spaced tubes extending across said burner port, a fuel burner arranged to discharge fuel through said burner port comprising a plurality of transversely spaced hollow fuel discharge members extending along and fitting against the outer sides of corresponding tubes, each of said members having fuel discharge openings therein at opposite sides of said corresponding tubes, and air supply means opening to said burner port.

5. In a furnace wall having a fuel burner port and a series of transversely spaced tubes extending across said burner port, a fuel burner arranged to discharge fuel through said burner port comprising a plurality of transversely spaced hollow fuel discharge members extending along and fitting against the outer sides of corresponding tubes, each of said members having fuel discharge openings along opposite sides thereof, an air supply casing surrounding said fuel burner and opening to said burner port, and a gaseous fuel conduit in said casing connected to each of said fuel discharge members.

6. In a furnace wall having a fuel burner port, a fuel burner arranged to discharge fuel through said burner port comprising a plurality of transversely spaced hollow fuel discharge members, an air supply casing surrounding said fuel burner and opening to the spaces between said fuel discharge members, a series of transversely spaced damper members each of progressively varying cross-sectional area positioned between said fuel discharge members, and means for bodily moving said damper members to vary the effective flow area through the spaces between said fuel discharge members.

7. In a furnace wall having a fuel burner port, a fuel burner arranged to discharge fuel through said burner port comprising a plurality of transversely spaced hollow fuel discharge members, an air supply casing surrounding said fuel burner and opening to the spaces between said fuel discharge members of ovate cross-section, a series of transversely spaced damper members positioned between said fuel discharge members, and control mechanism for bodily moving said damper members relative to said fuel discharge members to thereby vary the effective flow area through the spaces between said fuel discharge members.

8. In a furnace wall having a fuel burner port, a gaseous fuel burner arranged to discharge fuel through said burner port comprising a plurality of transversely spaced hollow fuel discharge members of outwardly tapering cross-section having fuel discharge openings at opposite sides thereof, an air supply casing surrounding said fuel burner and opening to the spaces between said fuel discharge members, a series of transversely spaced damper members of inwardly tapering cross-section positioned between said fuel discharge members, and control mechanism for bodily moving said damper members relative to said fuel discharge members to thereby vary the effective flow area through the spaces between said fuel discharge members.

9. In a furnace wall having a fuel burner port and a series of transversely spaced tubes extending across said burner port, a fuel burner arranged to discharge fuel through said burner port comprising a plurality of transversely spaced hollow fuel discharge members at the outer sides of corresponding tubes, an air supply casing opening to the intertube spaces, a series of transversely spaced dampers positioned at the outer sides of corresponding intertube spaces, and means for moving said damper members to vary the effective flow area through the intertube spaces.

10. In a furnace wall having a fuel burner port and a series of transversely spaced tubes extending across said burner port, a fuel burner arranged to discharge fuel through said burner port comprising a plurality of transversely spaced hollow fuel discharge members extending along and in contact with the outer sides of corresponding tubes, said fuel discharge members having fuel discharge openings therein at opposite sides of said corresponding tubes, an air supply casing surrounding said fuel burner and opening to the intertube spaces, a series of transversely spaced damper members positioned between said fuel discharge members, and control mechanism for bodily moving said damper members relative to said tubes to thereby vary the effective flow area through the intertube spaces.

11. In a furnace wall having a fuel burner port and a series of transversely spaced wall cooling tubes extending across said burner port, a gaseous fuel burner arranged to discharge fuel through said burner port comprising a plurality of transversely spaced hollow fuel discharge members of outwardly tapering cross-section extending along and in contact with the outer sides of corresponding tubes, said fuel discharge members having fuel discharge openings along the sides thereof, an air supply casing surrounding said fuel burner and opening to the intertube spaces, a series of transversely spaced damper members of inwardly tapering cross-section positioned between said fuel discharge members and having sides parallel to the adjacent sides of the adjacent fuel discharge members, and control mechanism for bodily moving said damper members relative to said tubes to thereby vary the effective flow area through the intertube spaces.

RALPH M. HARDGROVE.

CERTIFICATE OF CORRECTION.

Patent No. 2,119,580. June 7, 1938.

RALPH M. HARDGROVE.

It is hereby certified that error appears in the printed specification of the above numbered patent requiring correction as follows: Page 3, first column, line 56, claim 7, strike out the words "of ovate cross-section" and insert the same after "members" in line 57, same claim; and that the said Letters Patent should be read with this correction therein that the same may conform to the record of the case in the Patent Office.

Signed and sealed this 27th day of September, A. D. 1938.

Henry Van Arsdale (Seal) Acting Commissioner of Patents.